(12) United States Patent
Friedman et al.

(10) Patent No.: US 8,181,260 B2
(45) Date of Patent: May 15, 2012

(54) TRACKING THE ORIGINS OF DATA AND CONTROLLING DATA TRANSMISSION

(75) Inventors: Julian L. Friedman, Southampton (GB); Peter Verdon, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 841 days.

(21) Appl. No.: 12/173,138

(22) Filed: Jul. 15, 2008

(65) Prior Publication Data
US 2009/0049557 A1  Feb. 19, 2009

(30) Foreign Application Priority Data

Aug. 15, 2007 (EP) .................................. 07114359

(51) Int. Cl.
*G06F 7/04* (2006.01)
*G06F 17/30* (2006.01)
*H04N 7/16* (2011.01)

(52) U.S. Cl. ............... 726/27; 726/2; 713/152; 713/154; 380/59; 709/200

(58) Field of Classification Search ...................... 726/27
See application file for complete search history.

(56) References Cited

U.S. PATENT DOCUMENTS

| 7,454,457 | B1* | 11/2008 | Lowery et al. ................. 709/203 |
| 2005/0149726 | A1* | 7/2005 | Joshi et al. ..................... 713/164 |
| 2007/0079361 | A1* | 4/2007 | Hays et al. ......................... 726/5 |
| 2007/0107057 | A1 | 5/2007 | Chander et al. |
| 2007/0124414 | A1* | 5/2007 | Bedingfield et al. .......... 709/217 |
| 2008/0313648 | A1* | 12/2008 | Wang et al. .................... 719/315 |
| 2010/0275025 | A1* | 10/2010 | Parkinson ..................... 713/176 |

OTHER PUBLICATIONS

David Flanagan: "Javascript: The Definitive Guide", Aug. 17, 2006, O'Reilly Media, Inc., XP002517763, ISBN: 0-596-10199-6.

* cited by examiner

*Primary Examiner* — Oscar Louie
(74) *Attorney, Agent, or Firm* — Law Office of Jim Boice

(57) ABSTRACT

Provided are methods, apparatus and computer programs for tracking the origins of data and controlling transmission of the data. In one embodiment, transmission of sensitive data by script operations is limited, to prevent transmission to any network location other than to the source of that sensitive data, by a new function within a scripting engine of an HTTP client that is responsive to origin tags placed within the data. Origin tags that are associated with data inputs are propagated to any output data items, so that transmission of derived information can also be controlled.

15 Claims, 5 Drawing Sheets

TRACKING THE ORIGINS OF DATA AND CONTROLLING DATA TRANSMISSION

FIELD OF THE INVENTION

The present invention provides methods, data processing apparatus and computer programs for tracking the origins of data and controlling transmission of sensitive data, for scriptable clients such as Web browsers.

BACKGROUND OF THE INVENTION

Web browsers are computer programs that run on a user's data processing apparatus and provide access to information on the World Wide Web—submitting requests using the HyperText Transfer Protocol (HTTP) to Web server computers to retrieve Web pages and to browse or interact with Web page contents. Some Web browsers and similar HTTP clients can interpret script languages. Typically JavaScript™ (JAVASCRIPT is a registered trademark of Sun Microsystems in the United States and other countries) is used, although VBScript (Visual Basic Scripting Edition) is understood by some Web browsers and the mechanism is extensible to other languages. By including scripting-language instructions in the text of a page, authors can cause it, when viewed with a suitably-capable browser, to exhibit arbitrarily complex behavior as well as, or instead of, appearing as a static document. Such instructions may be included directly, or included by reference to a separate file in which the instructions are contained.

Embedded scripting instructions in a Web page are interpreted by a subsystem or "scripting engine" within the browser. This engine is itself written in a programming language, typically a more structured language such as C++ or Java™ (JAVA is a registered trademark of Sun Microsystems in the United States and other countries). The engine is capable of performing a number of operations; each scripting language instruction is literally an instruction to the engine to perform a specific one of its available operations.

The scripting engine also has access to the data structures that represent the Web page itself within the browser. Certain of the operations that can be performed by the engine involve reading from or writing to these data structures, effectively editing the page as viewed in the browser. Other sources of data that can be used in scripting operations include script variables, which can be set with an initial value or filled from any other source, and other data downloaded separately using a technique known as "XMLHttpRequest".

As well as manipulating information strictly within the scripting engine, and exchanging information with the internal representation of a Web page, there exists a class of script instructions that cause the browser to interact with other systems via its network connection, or perform other actions normally commanded by a human user. The choice of instructions available in this set is typically limited in order to reduce the effect that a malicious script can have.

It is important to note that because scripts arrive as part of a Web page, and because scripts themselves may contain information which may later be inserted into a page, scripts themselves are a form of data and all considerations of "data elements" in this invention will apply equally to the list of instructions that make up a script.

As an example of how the above facilities may be used, consider a Web-based document-editing application delivered in the form of a Web page using AJAX (Asynchronous JavaScript and Extensible Markup Language-XML) technology. A graphical Web browser initially downloads a page carrying the various display elements (such as rulers, buttons, and an area for editing text) and also referring to a file of scripting instructions. These instructions direct the scripting engine in how to respond to the user's actions. If the user were to activate the "bold" button, for instance, the scripting engine might be instructed to first read the page in order to determine which words in the text area the user has selected. This information would be used by another instruction that modifies the page data structures in such a way as to mark that text as bold. Finally, another part of the browser known as the "rendering engine" would read those marks, and as a result would cause the marked words to appear in bold-face on the page.

Scriptable HTTP clients, such as Web Browsers that support JavaScript, have traditionally loaded data from only one source location at a time. However, it is desirable in a Web services environment to be able to combine scripts and data from several source locations in one scripting environment. Returning to the example of a Web-based document editing application, it is currently necessary for users to expose and entrust their documents to the providers of the application, for example by uploading documents to the provider's server.

Although large numbers of application programs are currently being made available via the World Wide Web in the form of Web services that exploit scripts running within a Web browser and communicate with Web servers, many organizations and individuals are unwilling to accept the inherent exposure of their confidential documents. This limits use of the available applications.

It would be possible for applications of this kind, written in a scripting language within the client, to be run on data obtained from one or more different locations. However, once the scripts and data are loaded into the scripting environment, there is currently no suitable mechanism for ensuring that the scripts do not transmit the data back to their own servers, either maliciously or in the course of providing a function such as spell checking. The known solutions involve preventing unauthorized scripts from accessing certain files and objects, but this can be overly restrictive.

For example, U.S. Pat. No. 6,986,062 describes controlling the ability of scripts to access objects based on the origin of the scripts and defined permissions. Entries in a client's access control data structure include a source identifier field and a permission identifier field associated with an object—the origin of the script is recorded and subsequently checked, and unauthorized scripts are prevented from accessing certain objects.

U.S. Pat. No. 6,505,300 describes restricting execution context for untrusted content such as scripts. When a process attempts to access a resource, a token associated with the process is compared against security information for the resource to determine whether that access is allowed. The source of a script may determine how trusted it is and what processes can be performed on particular resources.

US Patent Application No. 2006/0230452 discloses obtaining a file from an external location and adding tagging information regarding the origin of the obtained file. The origin of the obtained file can be used for subsequent security policy decisions, such as whether to allow or block execution or rendering of the content.

BRIEF SUMMARY OF THE INVENTION

A first aspect of the present invention provides a method for controlling transmission of sensitive data, comprising the following steps performed within a scripting environment: associating an indication of origin with a first data element; propagating indications of origin to a data element generated from the first data element; and restricting transmissions of the first data element and said generated data element to only permitted destinations that are identified with reference to the indications of origin.

The first data element may comprise part of a set of data elements, and potentially a very large set of data, with which the indication of origin is associated. The generated data element may also be one of a set of generated data elements.

In one embodiment of the invention, the first data element and any data elements generated from the first data element are prevented from being transmitted to any origin other than the origin of the first data element. This can prevent scripting operations from transmitting sensitive data across a network to any network node other than the source of the data, while allowing scripts to collaborate within the constraints of the rules that restrict data transmission.

In one embodiment, if new data elements are generated within the scripting environment from multiple data elements that each has associated indications of origin, the new data elements will have associated indications of origin derived from the multiple data elements. If multiple sensitive input data elements have different origins, the step of restricting transmission may prevent transmission of output data to any destination; whereas an output derived from multiple input data elements that have a common origin may be transmitted back to the common origin while being prevented from being transmitted to any other destination.

The step of restricting transmission is advantageous within a scripting environment that is running 'untrusted' scripts. An 'untrusted' script in this context is any script for which the security controls or trustworthiness of the script or its provider has not been verified (and so the term 'untrusted' does not imply that the script or its provider has been recognized as having any malicious intent).

The invention provides protection for sensitive data when the data is operated on by a script, with assurance that the script is not sending that data to any server that does not already have the information, without the need to verify the trustworthiness of the script or its provider. The steps of associating and propagating an indication of origin may be implemented by a scripting engine within a Web browser, which is responsive to security tags within data to prevent any script sending the tagged data to a location other than the data's source location. The tags are indicative of the origin location of the data. The "scripting engine" according to one embodiment comprises a script interpreter, a tag generator and a tag propagator.

A second aspect of the invention provides a data processing system comprising; at least one data processing unit; at least one data storage unit; a script interpreter; means for associating an indication of origin with a first data element; means for propagating the indication of origin to a new data element generated from the first data element; and means for restricting transmissions of the first data element and said generated data element from the data processing system to only permitted destinations that are identified with reference to the indications of origin.

In one embodiment of this second aspect, the script interpreter, means for associating, means for propagating and means for restricting transmission are all implemented within a scriptable HTTP client computer program such as a Web browser. In one embodiment, the means for associating and means for propagating are provided as features of an improved scripting engine within an HTTP client program, which may be made available as a program product comprising computer-readable program code on a recording medium.

BRIEF DESCRIPTION OF THE DRAWINGS

Embodiments of the invention are described below in more detail, by way of example, with reference to the accompanying drawings in which.

DETAILED DESCRIPTION OF THE INVENTION

1. Network Environment and Example Client System

Figure 1:
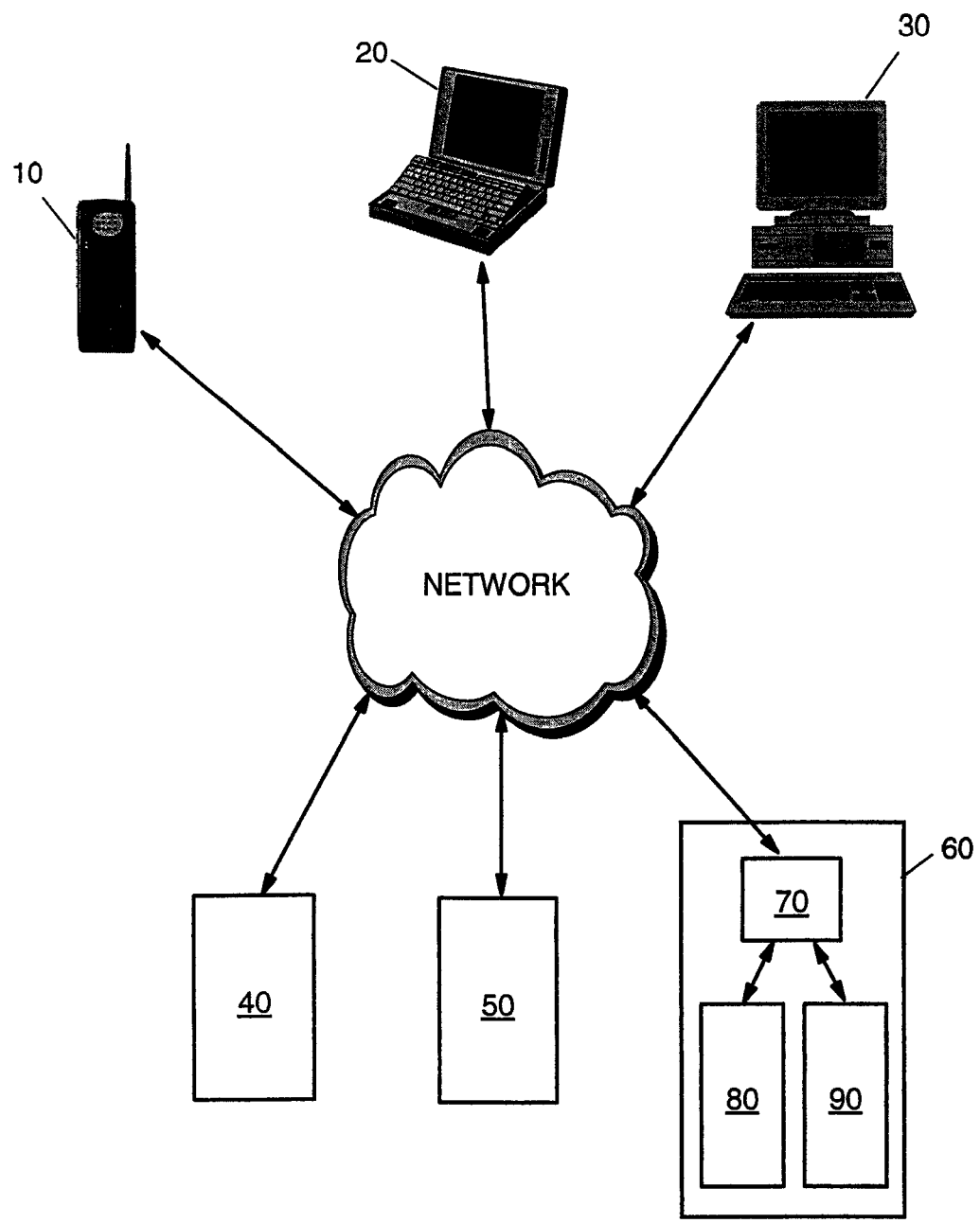
FIG. 1 is a schematic representation of a network in which the present invention may be implemented.
Figure 2:
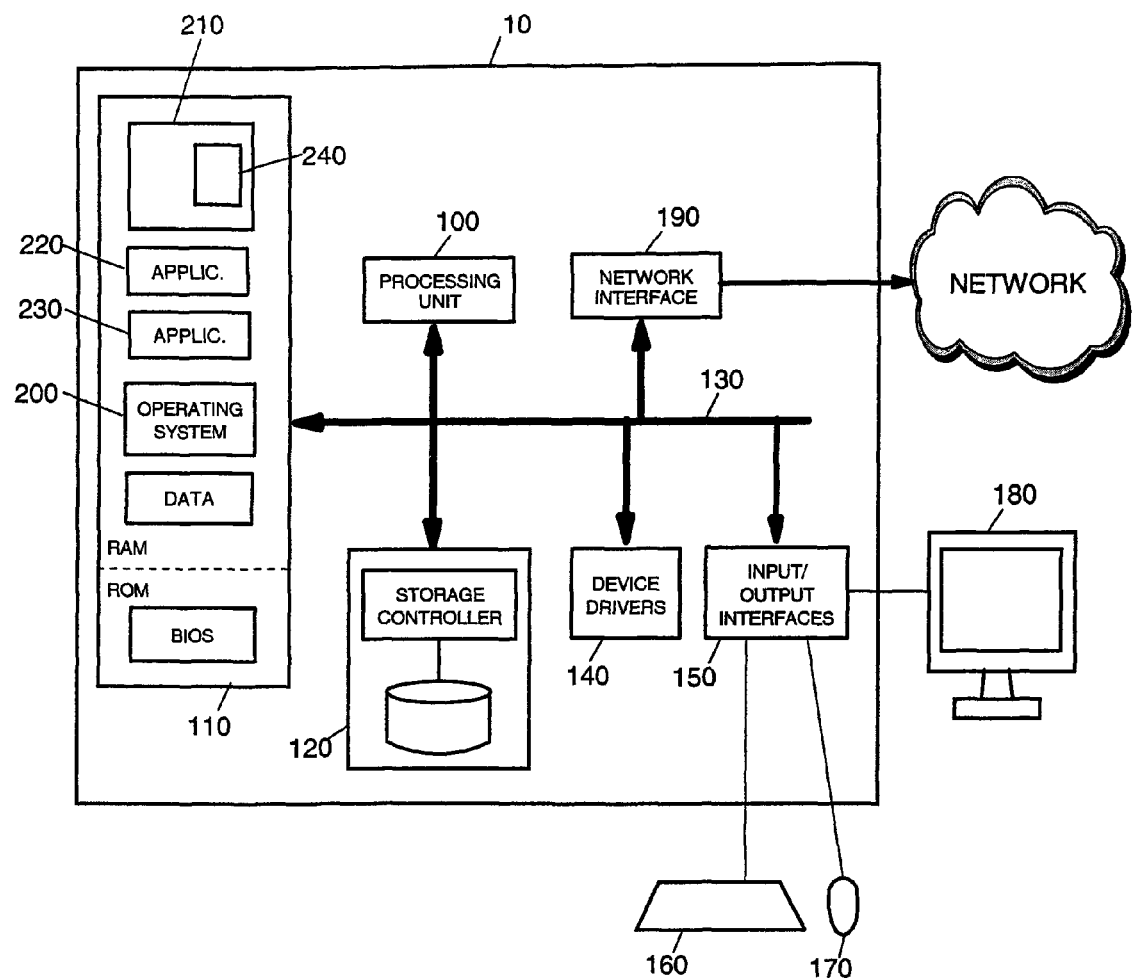
FIG. 2 shows an example client data processing system in which the present invention may be implemented.

The distributed data processing network shown schematically in FIG. 1 includes any number of client data processing systems 10,20,30 and server data processing systems 40,50, 60 which communicate with each other via HTTP. Although the present invention is not limited to a particular type of data processing system either in terms of the system hardware or operating system environment, a typical client system 10 as shown schematically in FIG. 2 may be a laptop or desktop data processing system that includes at least one data processing unit 100, at least one data storage unit typically comprising a volatile system memory 110 and a non-volatile storage component 120 such as disk storage, an internal communications bus 130, input/output components including device drivers 140 and connection interfaces 150 for a mouse 160, keyboard 170 and monitor 180, and a network interface 190. The typical client system used in an implementation of the invention has a number of program code components installed thereon including operating system software 200, a Web browser 210 and a number of application programs 220,230. The Web browser 210 is adapted for interaction with remote Web servers via network communications using the request-response HTTP model. The Web servers 40,50,60 may each comprise one or more HTTP servers 70 and one or more application servers 80,90 running on either a single server data processing system or a cluster of servers that cooperate to provide high availability and throughput, but the present invention does not require any specific Web server architecture.

Figure 3:
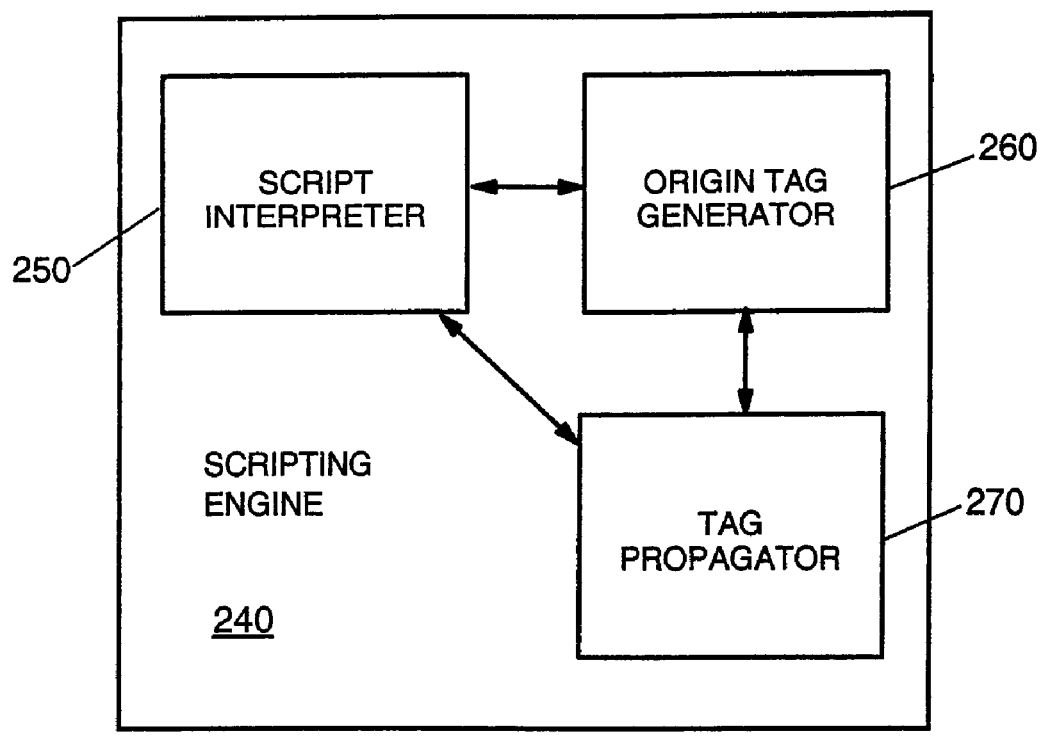
FIG. 3 shows components of a scripting engine according to an embodiment of the invention.

In a client system for use with the present invention, the Web browser 210 includes a script interpreter, comprising a major component of a scripting engine 240 that enables execution of scripts within downloaded Web pages. Various components and features of the present invention are described below with reference to FIGS. 3-6, in the context of an embodiment of the invention in which several components are implemented as program code components of a novel scripting engine. As shown in FIG. 3, the scripting engine 240 comprises a script interpreter 250, an origin tag generator 260 and a tag propagator 270. It will be understood by persons skilled in the art that various components of the invention, such as the means for preventing transmission described below, could equally be implemented as a hardware component such as an application-specific integrated circuit (ASIC).

As described below, generated and propagated tags are used by the Web browser or other HTTP client to control transmission of sensitive data elements.

2. Generation and Storage of Tags Indicating Origin

As described previously, there exist a number of kinds of data element which can be used in scripting engine operations. All these elements are stored in data structures associated with the scripting engine 240 itself or associated with the Web browser 210 (or, in other implementations, associated with another program of which the scripting engine is a part). While the scripting operations will read and modify the data within these data structures as part of their internal workings, no scripting operations exist by which a script can, for its own ends, examine or change the data structures themselves.

In existing scripting engines, these data structures typically contain both a data element's current value and some additional information for the scripting engine's use. One example of such information is information relating to automatic garbage collection. The present invention involves associating indications of origin with data elements, and the "annotations" to a data element that are involved in implementing the invention may be stored in the scripting engine's data structures in the same way as other information that is provided for the scripting engine's use. This means that only small changes to current Web browsers and other scriptable HTTP client programs are required to implement the present invention, and it ensures that there is no mechanism available for scripts to interfere with their own annotations.

Figure 4:
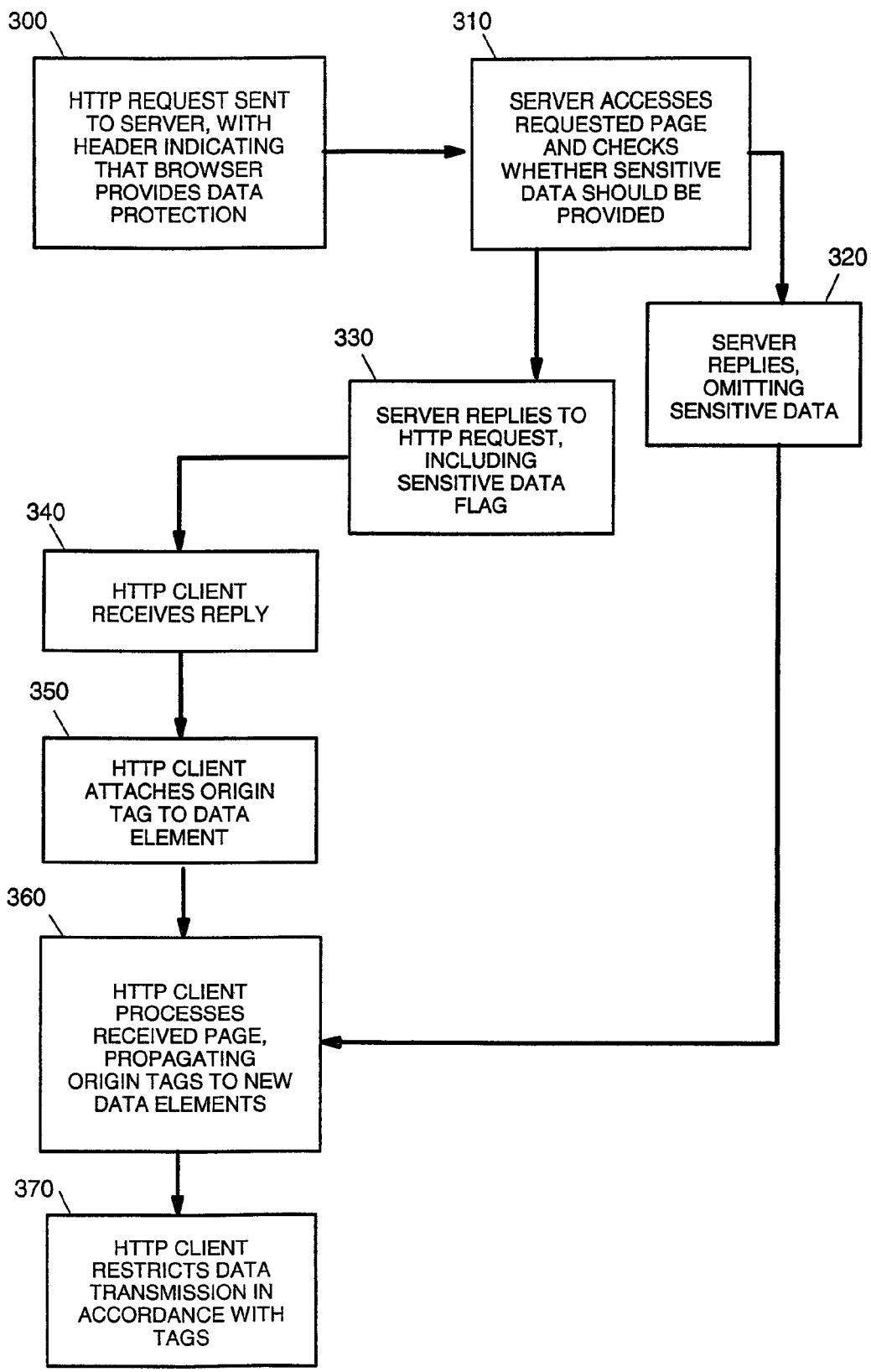
FIG. 4 shows a sequence of operations of an interaction between a client and server according to an embodiment of the invention in which origin tags are generated and stored, before being propagated to new data elements and then used to prevent transmission of sensitive data to destinations other than the origin of the data.

FIG. 4 shows a sequence of steps involved in the initial generation of origin-indicating tags or "annotations" for a set of data elements. All data regarded as sensitive must be assigned an origin tag before it is first used in a script operation. There are many ways in which data can be brought into a modern Web browser, but the majority of them involve the HTTP protocol (specified in the W3C Network Working Group's Request For Comments 2616 "Hypertext Transfer Protocol—HTTP/1.1", June 1999). For such methods, a Web browser or other HTTP client that is adapted to implement the present invention can use a special HTTP header in the request, and another special HTTP header in the response. Note that the HTTP specification allows extra headers to be used; systems that do not implement the relevant functionality will ignore headers relating to it.

Thus, as shown in FIG. 4, a client-server interaction sequence according to an embodiment of the invention begins with a scriptable client such as a Web browser sending 300 an HTTP request to a Web server. Although not all HTTP clients will implement this invention, the clients that do implement the invention will typically include a new header (among the many headers that accompany each request for data) indicating that fact.

Currently available Web browsers already send a great deal of information about the functionality they support, and even the kind of content that their users require, such as which (human) languages are acceptable. For example, a request might look like this:

```
GET / HTTP/1.1
Host: ibm.com
User-Agent: Mozilla/5.0 (Windows; U; Windows NT 5.1; en-US; rv:1.5)
1Accept: text/xml,application/xml,application/xhtml+xml,text/html;q=0.9,
   text/plain;q=0.8,video/x-mng,image/png,image/jpeg,image/
gif;q=0.2,*/*;q=0.1
Accept-Language: en-us,en;q=0.5
Accept-Encoding: gzip,deflate
Accept-Charset: ISO-8859-1,utf-8;q=0.7,*;q=0.7
```

-continued

```
Keep-Alive: 300
Connection: keep-alive
```

A new request header can be added to identify whether the requestor can provide protection for "secure" content. The content type "secure" differs from existing categories of content (since it is not a MIME type, a human language, a type of encoding or a character set). In a first embodiment, the new request header has a field name 'Accept-Security:', but this is merely an illustrative example. Whatever the field name may be, the new header field can be a simple indication of whether data protection is provided by the requesting client using origin tagging.

The request header "Accept-Security: origin-tagging" implies that the browser can protect secure data if the server wishes to send it, but this does not demand secure data. The additional header could be included in every HTTP request, although this is not essential. Such a new header allows for future extension with different kinds of optionally-implemented security. For example, the 'Accept-Security:' request header and the restriction of transmission of data based on origin-tagging might be implemented together with another security option.

The server accesses 310 the requested page ready for downloading to the client, but the Web server may be configured to check for the presence of the new request header before transmitting any sensitive data. The check may be performed for all HTTP requests, or only in response to the Web server identifying sensitive data within the accessed page if the Web server is provided with a mechanism to detect the indications of data sensitivity when responding to an HTTP request. In one embodiment, indications of data sensitivity may be inserted when creating or storing data on a content server.

The particular sequence regarding whether to check client capabilities before or after checking for data sensitivity is not critical to the invention. If the Web server identifies sensitive information within the requested page, and the Web server determines that the requesting client has not committed to protect that data (i.e. has not included the new header in the request), the server according to one embodiment of the invention replies 320 to the client by declining the request or by providing the requested page without the sensitive data.

Web servers can be programmed and configured to behave in different ways (and some Web servers may not implement any new functions to support the present invention), but the new request header that is provided in the present embodiment makes it possible for servers to make an informed decision regarding whether to provide sensitive data. A server can then decline to provide its sensitive data to any client that has not notified the respective server of the client's ability and commitment to protect sensitive data.

Note that the embodiment of the invention described above does not include any mechanism to prevent an HTTP client claiming to protect sensitive data when in fact it does not. In this first embodiment, the HTTP client is regarded as an agent of the human user, and the scope of this invention extends only to data with which the user is trusted. A known solution for user authentication should be used to ensure that only authorized users may obtain the sensitive data.

If the web server identifies sensitive data in the requested page and the check of fields within the request header determines that the requesting client provides protection for sensitive data, the Web server transmits 330 the requested page and a 'sensitive data' flag to the requester client. Although orthogonal to this invention, it is generally desirable for any transmission of sensitive data to be protected using a security mechanism such as the Secure Sockets Layer to prevent its interception in transit.

Thus, in the present embodiment, the determination of which data is sensitive is performed by the server providing it. When sensitive data is provided 330 in response to an HTTP request, the response will carry a header indicating that its contents are to be handled as sensitive data according to the invention. The 'sensitive data' header may include an explicit instruction from the Web server regarding the specific origin information to include in the origin tag, and this instruction will be acted on by the origin tag generator 260. If the client receiving 340 this data is scriptable, and the data is to be placed in an area of memory accessible to script operations, the client must attach 350 an origin tag to the data when saving the data and before executing scripts. Thereafter, the origin tags are propagated 360 to any new data elements generated within the client from the received data elements (as described below) and the origin tags are used to control transmission 370 of tagged data elements (also described below).

The degree of precision with which the origin is to be described in the tag can be determined by the server. For example, a small company might serve all documents on its intranet with a header that causes browsers to apply an origin tag of "company.com" to that data. Scripts could then send that data to any system within the company, but not to anywhere outside. A larger company might restrict some of its data more tightly, perhaps with headers that cause browsers to tag it with "secretdocstore.r-and-d.company.com" or "webapps.finance.company.com". A Web application on a shared server, which cannot trust the other applications that might also reside there, could serve data such that it is tagged with a domain of "apps.sharedhostingcompany.com" but also a port number of "8080" and a file path of "/customers/account42/secretdocs"; this provides an indication of origin based on location information that is exclusively under the particular Web application's control, whereas other locations on the same server may be specified less precisely. Thus, a location which is under the Web application's exclusive control can be specified as follows:

http://apps.sharedhostingcompany.com:8080/customers/account42/secretdocs/

The tagging scheme described above thus has sufficient precision to be able to handle the case of shared servers; whereas a host name may be sufficient when not dealing with shared servers.

Information typed into scripted dialog boxes and text boxes on the page, and data loaded from local files, do not have an origin server to which the question of sensitivity can be delegated. This issue can be addressed by tagging information that is obtained from the user, or is otherwise obtained from or generated on the computer on which the scripting engine is running, with a special origin tag meaning "local". This tag is broadly similar to other origin tags, but can be given special treatment as described below.

Most browsers can also access data via protocols other than HTTP, with the File Transfer Protocol (FTP) being a widely used example. In some cases, these protocols could also be extended with additional headers as described above for HTTP; whereas in other cases it is more appropriate to treat the data in the same way as local files (for example, where browsers implement the SMB or NFS shared-filesystem protocols) using the above-described "local" origin tag. The present invention remains useful and valid even if some esoteric protocols are left without an origin-tagging system, as they are unlikely to be used in the kind of Web applications that would benefit from the invention.

In one embodiment of the invention, the above-described techniques for generating and storing annotations are enhanced to reduce the storage capacity required and to permit a faster implementation of annotation propagation. In typical use, there will only be a small number of annotation values (perhaps only one) in use at any time, but these values may be applied to a great many individual data elements. The enhancement takes account of this characteristic and makes use of a central table of origin values. Individual annotations need only point to the appropriate row of the table rather than carry their own copy of the value.

3. Propagation of Tags

Once an item of data has an origin tag, the same tag is propagated 360 to any other data derived from it. More specifically, for all script operations that have both an input and an output, any origin tags existing in the data structures of the former will be transferred by the tag propagator component 270 of the scripting engine 240 to the corresponding data structures of the latter. For example, the JavaScript String.subString( ) method is an operation that takes a string of text as input and produces a shorter string of text as output. If this method were used in the scripting engine 240 according to the present invention to extract some text from a page obtained securely from "example.com", the extracted text would also be tagged with an origin of "example.com". For this embodiment, any scripting operation performed on an object should be regarded as taking the object as an input.

As described in the background section above, scripting engines are typically written in structured languages and provide certain operations. Those operations are defined by program code written in that structured language. In the present embodiment, the additional behavior described in this section is implemented by adding a tag propagation function to the program code within the scripting engine. A script would continue to demand a series of operations exactly as it would in a scripting engine that does not implement this invention, but with origin tags being generated 350 and then propagated 360 transparently to the user and script-programmer.

When a script operation operates upon more than one item of input, and at least two of the input items have origin tags that are not all from the same origin, the output data acquires a special tag. Because tagged data cannot be sent anywhere except its origin, and the source of the new data encompasses multiple origins, there exists no location to which it can be sent within the rules for permitted transmission. Thus, the special tag indicates "nowhere", and data which is tagged in this way cannot leave the scripting environment.

In this particular embodiment, the above-described propagation makes use of four increasingly restrictive origin-tag types:

NONE: The item has no origin tag, because the HTTP session or other means by which it was obtained was not designated as secure.

LOCAL: The item was entered by the user, or loaded from a local file.

ORIGIN: The standard origin tag, indicating the location from which the data was obtained. There may be a number of different origins in use simultaneously in a scripting environment.

NOWHERE: The path by which this data item was obtained involved data tagged with more than one origin.

The way in which these kinds of tags interact in the case of a two-input scripting operation is illustrated by Table 1:

TABLE 1

|  |  | Tag Type on Input One | | | |
| --- | --- | --- | --- | --- | --- |
|  |  | NONE | LOCAL | ORIGIN | NOWHERE |
| Tag Type on Input Two | NONE | none | local | origin | nowhere |
|  | LOCAL | local | local | origin | nowhere |
|  | ORIGIN | origin | origin | origin/ nowhere | nowhere |
|  | NOWHERE | nowhere | nowhere | nowhere | nowhere |

As depicted in Table 1, tag types on output data are show for a two-input scripting operation. Note that where two "origin" tags are combined, the result (either "origin" or "nowhere") depends on whether their origins are the same.

Just as for a two-input operation, a scripting operation with three or more input elements will assign to its output(s) the most restrictive tag-type found among the inputs, except that if the most-restrictive type is "ORIGIN" and more than one origin location is present, "NOWHERE" will be used for output as previously described. In the case of a single-input operation, all outputs simply inherit the tag of the input item.

Figure 5:
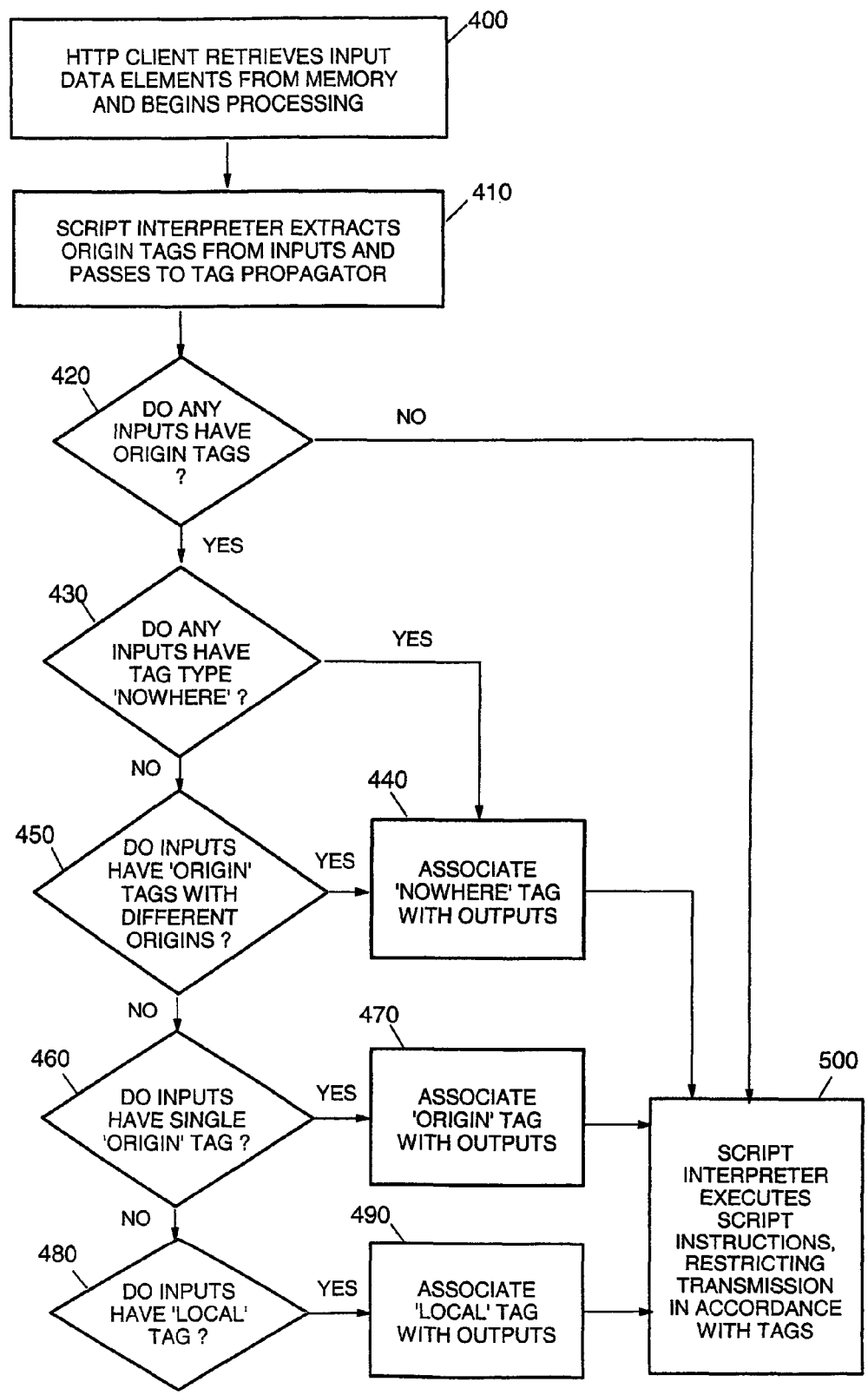
FIG. 5 shows a sequence of operations for propagating annotations according to an embodiment of the invention.

A sequence of steps for the determination of the tags to be associated with outputs of scripting operations is represented in FIG. 5, although the particular operational sequence shown in FIG. 5 relates to only one illustrative embodiment of the invention. According to this embodiment, when an HTTP client retrieves 400 input data (such as a retrieved Web page) from its local memory to begin processing, the HTTP client processes the input data in a conventional manner until a script is identified. The HTTP client then calls its script interpreter 250. Before executing each script instruction, the script interpreter extracts 410 the set of tags associated with input data elements and passes them to the tag propagator 270. The tag propagator then applies a set of rules to determine a suitable tag for the scripting operation's outputs. A shortcutting of this process is possible if a check 420 for the presence of any origin tags on input data determines that there are no tags associated with input data elements. This 'shortcut' is shown in the arrow between step 420 and step 500 of FIG. 5.

If the inputs had no tag, as determined at step 420, the outputs will also have no associated tag. However, if new data elements are entered by the user or are loaded from a local file, these inputs will be treated as having tag type LOCAL, in which case the outputs of the scripting engine's processing will also have an associated tag type LOCAL (or, if combined with other tagged inputs, a more restrictive tag type). This is explained in more detail below.

If the determination at step 420 is positive, because relevant input tags exist, the tag propagation process according to the present embodiment is implemented in a sequence starting with the most restrictive tag type. That is, a first step performed by the tag propagator 270 comprises determining 430 whether any inputs have tag type NOWHERE. If so, the tag type NOWHERE is associated 440 with the scripting engine's output data element or elements.

How the tags are used to control data transmission is described in more detail below, under the section entitled 'Use of Indications of Origin to Control Data Transmission' that follows the description of the exemplary propagation sequence. However, an example of this control is provided here by way of illustration. When a data element has an associated tag type NOWHERE, the script interpreter will be able to execute 500 the script instructions, except that the HTTP client's operations in response to these script instructions will be subject to the limitations imposed by the associated tag NOWHERE. In particular, data elements with a NOWHERE tag will be prevented from being transmitted outside the scripting environment.

Returning to the propagation sequence of FIG. 5, if no input data elements have tag type NOWHERE, the propagator determines 450 whether there is a plurality of inputs for the particular script instruction which have a plurality of different ORIGIN tags. If so, the tag type NOWHERE is associated 440 with the output data element or elements.

If the determination at step 450 is negative, the propagator determines 460 whether the input data elements for the current script operation have a single ORIGIN type tag (i.e. there is only one sensitive data element, or all sensitive data elements have the same origin). If so, a relevant ORIGIN type tag is associated 470 with the script instruction's output data elements.

If the determination at step 460 is negative, the propagator determines 480 whether any inputs to the current script instruction have an associated LOCAL tag type (including data elements entered by the user or loaded from a local file, which are deemed to have a LOCAL tag—see above). If so, the LOCAL tag is associated 490 with the script operation's output data elements.

Having determined the tags to be associated with the outputs of the scripting operation, the scripting engine within the HTTP client then performs its processing 500, subject to restrictions on data transmission imposed by the tags as described below. Steps 410 to 500 are performed iteratively for each script instruction within a script, and the scripting engine propagates tags as it executes.

In addition to scripting operations, there may be other operations that have an effect on the scripts' domain but which are not actually script operations themselves. For example, a user typing in a text-box is creating LOCAL data, but the user may be combining this LOCAL data with ORIGIN data. In that case, it is desirable for the tag propagator component (or an equivalent component running elsewhere in the HTTP client) to apply rules to determine an appropriate tag for the resulting data. In the present embodiment, the HTTP client calls the tag propagator to determine an appropriate tag for any such combination of tagged data. In other embodiments, the tag propagator may be implemented as a separate component from the scripting engine. In the example of a user typing into a text box, the scripting engine is typically invoked for every keypress so that it can activate any part of a script that is registered to be notified of changes and so a tag propagator component of the scripting engine is easily invoked to determine appropriate tags for the new data.

4. Use of Indications of Origin to Control Data Transmission

Certain script operations involve the transmission of data from a Web browser to servers elsewhere on the network. For example, an HTML form (as defined in RFC 1866) may be submitted under script control, an XMLHttpRequest (as previously mentioned) may be used, or the browser may be instructed to access a URL whose "path", "query" or "fragment" parts have been specially constructed as a means of carrying data. This invention defines additional handling that must be performed before any data is allowed to leave the browser. The described behavior is implemented in the structured-language program code of the browser, without requiring any changes to a script running within it.

Any scripting operation which is identified as capable of transmitting data is made conditional on the tags of its input data. The input data of one script instruction may be the output of a previous script instruction, in which case the propagation of tags described above will have determined the relevant tag for controlling data transmission. The transmission control may be implemented as a component of the scripting engine 240 or may be implemented separately within the browser. If, according to the rules defined below, the data cannot be transmitted, the transmission operation must fail to complete. The operation preferably also reports an error (not necessarily direct to the user).

Some transmission operations may take multiple inputs, which could potentially have different tags. In this case, the tags should be combined as described above with reference to the tag propagator 270, before the rules for transmission are followed.

If the data being transmitted has no origin tag of any type, it may be sent out freely. This is the situation in browsers that do not implement the present invention (unless an alternative data protection mechanism is provided), as well as for browsers handling data that is non-sensitive.

If the data carries the special "NOWHERE" tag, it may not be transmitted outside the local scripting environment.

If the data carries an origin tag of type "ORIGIN", the data may be transmitted but only to a location compatible with its tag. A compatible location is one which:

has the same DNS domain, or a subdomain of it (for example, data whose origin is "dev.company.com" may be sent to "docstore.dev.company.com"); and resides on the Internet Protocol port that corresponds to the port number specified within the tag (if the tag specifies a port number); and if the tag specifies a path, also exists at that path or a descendant of it (for example, data whose origin includes the path "/apps/expensetool" may be sent to "/apps/expensetool/submitform").

If the data carries the special "LOCAL" tag, the following rules can be implemented by the browser:

1. If there is no data in the scripting engine with either "ORIGIN" or "NOWHERE" tags, the browser might assume that no sensitive data is involved and allow "LOCAL" data to be sent anywhere. This has the advantage of not changing the behavior of existing Web pages and applications, but alternative behavior may be preferred for data with a LOCAL tag to avoid a potential security exposure when first creating a new data element.

2. If some of the data in the engine is sensitive, then the browser may be configured to prevent transmission of "LOCAL" data, or to ask the user before transmitting "LOCAL" information. However, if delegating decisions to the user, it must be recognized that users sometimes accept security exposures when they should not. In many cases, data entered by the user will have been combined, through normal processing, with ORIGIN-tagged data before it is transmitted and so the rules for "ORIGIN" tags, rather than rules for "LOCAL" tags, would be followed.

3. When all the origin tags in the browser are the same, more cases could be handled without recourse to user control by allowing transmission of "LOCAL" data to that origin (while still questioning its dissemination elsewhere). This solution balances security and usability in common cases such as secure document-editing applications.

The set of rules described above strikes a balance between data security and disruption of the user experience, while recognizing that the browser may have no explicit knowledge of the sensitivity of such information.

5. Extension for Encrypted Data

The features described above provide a complete and advantageous system for controlling the transmission of sensitive information. However, it is possible to extend these facilities in a way that provides further useful capabilities, by including the concept of encrypted data. Note that this is entirely separate from any SSL-encryption of data streams in transit.

This facility requires that scripts be written specifically to make use of it, unlike the basic invention which is implementable with unaltered scripts and pages. To support the extension, new operations would be made available in the scripting engine that can convert data to and from an encrypted form using a suitable published cipher.

A fifth kind of origin tag is added: "ENCRYPTED". The rules for encrypted data are as follows:

Creation: Data can arrive encrypted, in which case this is indicated by a suitable HTTP header in the transmission that carried it. When the scripting engine's explicit encryption support is used to perform a scripting operation that encrypts existing data, the result is also labeled with this ENCRYPTED tag, regardless of any previous tag it may have carried.

Propagation: In general, combining encrypted data with other information is unlikely to be useful. However it is possible, in which case the output will acquire the tag of the input element that was not encrypted (or the most restrictive such tag if there is more than one) as for normal propagation described above.

Decryption: When encrypted data is decrypted using the scripting engine's facilities, the output is given the origin tag of "NOWHERE" and cannot be transmitted.

Transmission: Data tagged as ENCRYPTED may be transmitted anywhere, since it is useless to any entity which does not hold the key.

Thus, the present invention associates an indication of origin with sensitive data, either tagging individual data elements or tagging Web pages, files or databases that contain sensitive data, and then controls the onward transmission of that data in accordance with the tags. Sensitive data may be entered into a client data processing system by a user, or the data may be held on a secure content server such as within stored Web pages, but the invention is applicable to any data that is considered sufficiently sensitive to justify controlling its onward transmission. In the above-described embodiments of the invention, a great deal of data will not have its onward transmission constrained in this manner, because a vast amount of data that is available via the Internet is intended to be publicly available, and because the individual or organization that created or compiled a particular piece of information may have decided that no protection is needed. However, there is also a great deal of proprietary information that is accessible via data processing networks and could be exposed by 'untrusted' scripts, and yet needs to be protected if users are to make safe and effective use of available Web services and scripts without exposing their information to others.

It will be understood by persons skilled in the art that the particular embodiments of the invention described above may be modified or extended in various ways within the scope of the invention, and so the above detailed description of embodiments should be considered illustrative rather than limiting on the invention.

For example, the new request headers described above represent only one possible implementation of the invention, and an alternative implementation of the invention does not require new request headers. Instead, a security constraint on the use of requests of type XMLHttpRequest is relaxed and replaced by a modified scripting engine according to an embodiment of the invention, and tagging of data as sensitive whenever it is obtained from a third-party Website. Requests of type XMLHttpRequest currently cannot be used (at least not directly) by a script to obtain data from servers other than the one from which the script was downloaded. This is to prevent an attack in which malicious JavaScript takes advantage of a user's credentials, or the user's data processing system's location behind a firewall, to read data from a third party site into the Web browser, and then transmits that data back to the site from which the script originated. This is known as a "cross-site-scripting vulnerability". Using origin tags within a scripting engine according to an embodiment of the present invention, and identifying downloaded data as sensitive, such an attack can be prevented without relying on the known restriction on XMLHttpRequest. Thus, we can permit downloading of data from third party sites for useful processing, while tagging such data as sensitive to maintain security.

Secondly, different browsers may implement different mechanisms for inserting origin tags in response to receiving data that includes a "sensitive data" flag; and the categories and specific expression of origin tags within the relevant data structures can also vary between different embodiments of the invention. A typical skilled person will, once they have read the above description of desired behavior, recognize that there are various implementation options within the scope of the invention as defined in the present patent specification.

It should be understood that at least some aspects of the present invention may alternatively be implemented in a computer program product that comprises program code recorded on a recording medium, for controlling a data processing apparatus on which the program code executes a process for controlling transmission of sensitive data within a scripted environment

The invention claimed is:

1. A computer-implemented method for controlling transmission of sensitive data comprising the steps, performed within a scripting environment, of:
   a processor associating an indication of origin with a first data element;
   the processor propagating said indication of origin to a generated data element, wherein said generated data element was generated from the first data element, and wherein said propagating indications of origin comprises:
   identifying a set of one or more inputs to a scripting operation that generates one or more outputs;
   identifying any indications of origin that are associated with the one or more inputs;
   deriving secondary indications of origin from the inputs' indications of origin; and
   saving the secondary indications of origin in association with the one or more generated outputs; and
   the processor restricting transmission of the first data element and said generated data element to only permitted destinations that are identified with reference to the indication of origin, wherein said associating the indication of origin with the first data element and said restricting transmissions of the first data element are performed in response to determining that the first data element comprises sensitive data.

2. The computer-implemented method of claim 1, wherein the first data element is obtained from a source data processing system that is remote from the scripting environment, and wherein said restricting transmission comprises preventing transmission of the first data element to any destination other than the source data processing system.

3. The computer-implemented method of claim 1, wherein said associating the indication of origin with the first data element is performed in response to determining that the first data element is to be processed by a scripting operation.

4. The computer-implemented method of claim 1, wherein said associating, propagating and restricting are performed on a client data processing apparatus that comprises a network connection interface for communicating with a remote server data processing apparatus;
   wherein the computer-implemented method further comprises:
   the processor sending a request to the remote server data processing apparatus via the network connection interface, to retrieve the first data element from the remote server data processing apparatus; and
   the processor receiving data from the remote server data processing apparatus.

5. The computer-implemented method of claim 4, wherein said sending a request comprises specifying within the request that the client data processing apparatus comprises means for performing the step of restricting transmission.

6. The computer-implemented method of claim 5, wherein said associating the indication of origin with the first data element is performed in response to receiving data from the remote server data processing system, wherein said data from the remote server data processing system includes an indication that the data from the remote server data processing system includes sensitive data.

7. The computer-implemented method of claim 4, wherein said sending and receiving are performed by an HTTP client program, and wherein the first data element is obtained by the HTTP client program in response to an HTTP request that includes an indication that the HTTP client program can provide protection for sensitive data.

8. The computer-implemented method of claim 7, wherein said associating and propagating are implemented by a scripting engine running within the client data processing apparatus.

9. The computer-implemented method of claim 1, wherein the first data element is retrieved by a scripting operation from a data processing system that is remote from the scripting environment.

10. A data processing system comprising:
    at least one data processing unit;
    at least one data storage unit;
    a script interpreter;
    means for associating an indication of origin with a first data element;
    means for propagating the indication of origin to a generated data element, wherein the generated data element was generated from the first data element, and wherein said propagating the indication of origin comprises:
    identifying a set of one or more inputs to a scripting operation that generates one or more outputs;
    identifying any indications of origin that are associated with the one or more inputs;
    deriving secondary indications of origin from the inputs' indications of origin; and
    saving the secondary indications of origin in association with the one or more generated outputs; and
    means for restricting transmissions of the first data element and said generated data element from the data processing system to only permitted destinations that are identified with reference to the indications of origin, wherein said associating the indication of origin with the first data element and said restricting transmissions of the first data element are performed in response to determining that the first data element comprises sensitive data.

11. The data processing system of claim 10, further comprising:
- a network connection interface for communicating with a remote server data processing apparatus;
- means for sending a request to the remote server data processing apparatus via the network connection interface, to retrieve the first data element from the remote server data processing apparatus; and
- means for receiving data from the remote server data processing apparatus.

12. The data processing system of claim 11, wherein the means for associating and means for propagating comprise components of a scripting engine.

13. The data processing system of claim 12, wherein the means for associating, means for propagating and means for restricting comprise components of an HTTP client program.

14. The data processing system of claim 10, wherein the means for restricting transmissions comprises an application-specific integrated circuit.

15. A computer program product, comprising program code recorded on a memory device, for controlling a data processing apparatus on which the program code executes a process for controlling transmission of sensitive data within a scripted environment, wherein the process comprises the steps of:

- associating an indication of origin with a first data element;
- propagating indications of origin to a generated data element, wherein the generated data element was generated from the first data element, and wherein said propagating indications of origin comprises:
- identifying a set of one or more inputs to a scripting operation that generates one or more outputs;
- identifying any indications of origin that are associated with the one or more inputs;
- deriving secondary indications of origin from the inputs' indications of origin; and
- saving the secondary indications of origin in association with the one or more generated outputs; and
- restricting transmission of the first data element and said generated data element to only permitted destinations that are identified with reference to the indications of origin, wherein said associating the indication of origin with the first data element and said restricting transmissions of the first data element are performed in response to determining that the first data element comprises sensitive data.

* * * * *